United States Patent [19]
Perdue

[11] Patent Number: 6,050,864
[45] Date of Patent: Apr. 18, 2000

[54] AMPHIBIOUS BICYCLE

[76] Inventor: Joab Jay Perdue, 4210 W. Hester Rd., Amarillo, Tex. 79124

[21] Appl. No.: 08/935,636

[22] Filed: Sep. 23, 1997

[51] Int. Cl.[7] .................................................. B63H 16/00
[52] U.S. Cl. ................................................ 440/21; 440/30
[58] Field of Search ................................ 440/12, 21–30; 114/270

[56] References Cited

U.S. PATENT DOCUMENTS 2,757,631  8/1956  Truter ........................................ 440/12

FOREIGN PATENT DOCUMENTS 398919  1/1909  France ...................................... 440/12
27598  5/1912  United Kingdom ..................... 440/12

*Primary Examiner*—Ed L. Swinehart

[57] ABSTRACT

An amphibious bicycle intended to be highly efficient, safe and maneuverable forms of both land and water transportation. This achieved by the addition of a strong, rigid frame work, small paddles in the rear wheel assembly, and durable, nonsinkable pontoons of high density styrofoam, made structurally strong and protected by linear outside structural supports sandwiching them. And finally, adding bracing at strategic points to effectively maintain the pontoons' land or water position.

1 Claim, 1 Drawing Sheet

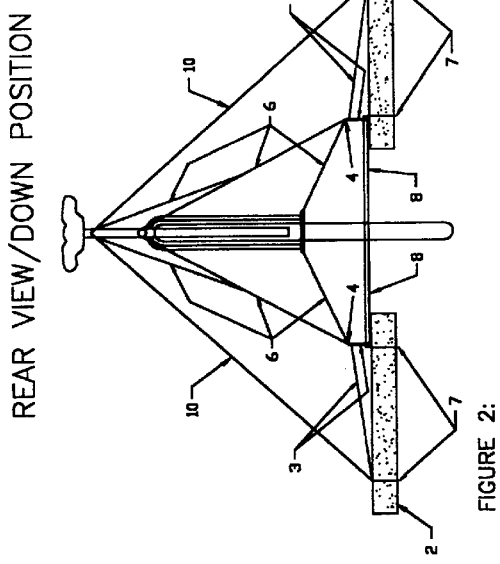
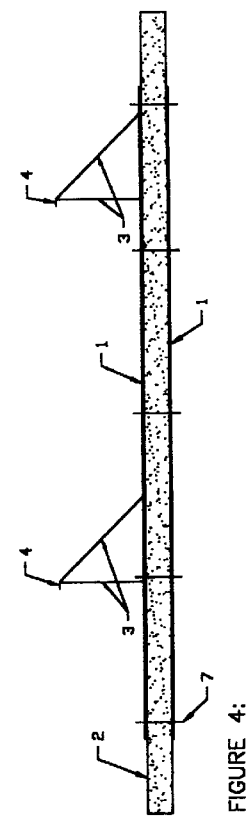
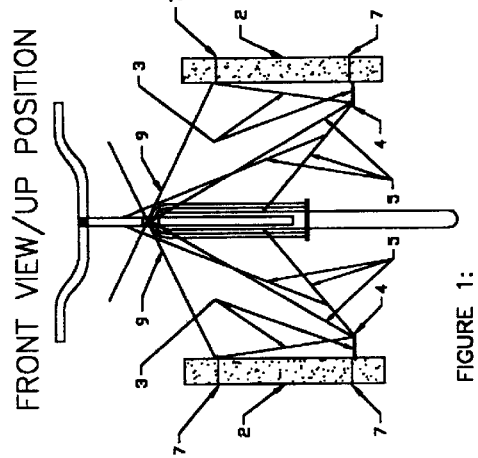
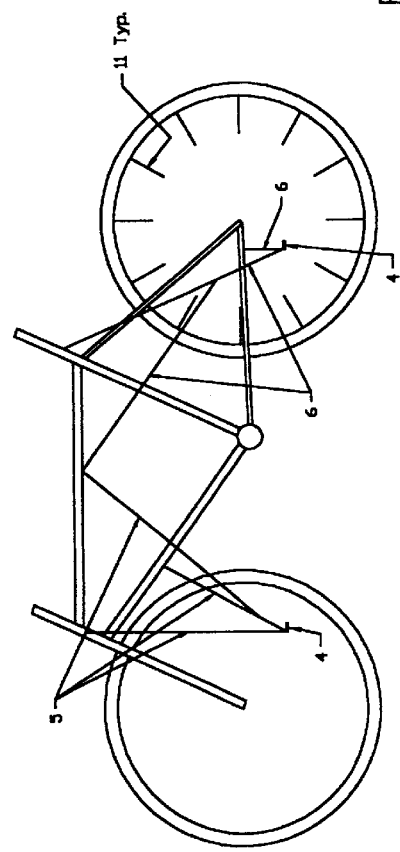

AMPHIBIOUS BICYCLE

BACKGROUND OF THE INVENTION

1. Field of the Invention

This invention concerns a bicycle that can be both pedaled across land and paddled across the water under human power.

2. Description of the Prior Art

It is often sought that human kind could move about on this planet in as fast, efficient, and simple a manner as possible and not be stopped at every creek, pond, river or lake. A truly amphibious human-powered vehicle could accomplish this goal, not only covering several miles per day on both land and water but in such a manner as that person could stay as dry as possible and protected up out of the water.

In general, prior attempts have fallen short of this goal in many areas. Either they were excessively heavy in construction, cumbersome to the rider, not convenient to maneuver or able to be pushed while walking. Other problems in earlier attempts were in flotation positioning. Floats were shaped and placed in such a way that when the contraption was launched would obviously sink 1 to 2 feet under water, only "half floating" and creating a very wet ride. Safety is another factor seemingly overlooked in the prior art. Tanks of various construction were employed so that when punctured, the vehicle would sink. Other attempts used air filled devices like large balloons extending from the axles. These all lack both safety and positive flotation that leaves the rider both high and dry.

It is accordingly and object of the present invention to provide a system that when launched in water keeps the rider high out of the water.

It is further an object of the present invention to use modern materials that are both light and safe, and to take the puncture factor out of its ability to float.

It is another object of the present invention to create a frame structure that is not only strong but out of the way of the rider both in the pedaling position and in the walking position.

It is a still further object that the apparatus have adequate ground clearance for maneuvering on land as a bicycle and be extremely stable in the water so as not to tip easily in any direction.

These and other beneficial objects and advantages will be apparent from the following description.

SUMMARY OF THE INVENTION

The above and other beneficial objects and advantages are accomplished in accordance with the present invention by:

a) a frame of aluminum, metal alloy, or plastic attached to the bicycle at 12 precise points, creating 4 attachment points for 2 pontoons, one on each side. These 4 attachment points are created to be inherently strong by the use of triangulation from the bicycle frame itself.

b) each of the back frame attachment points are brought out by three lengths attached in three basic areas. The first is attached in the vicinity of the back wheel axle, the second in the vicinity of the seat post, and the third in the vicinity of halfway down the bicycle's own upper seat to front fork support bar. These three structural pipes come together at a point that is 8" to 18" off the ground and 8" to 18" away from the center line or frame of the bicycle. These three members create a rigid attachment point on either side of the rear of the bicycle.

c) the two front attachment points are created in the same way. One member is attached to the frame between the pedal assembly and the front fork assembly, the second attaches to the front fork assembly itself, and the third member joins with the main upper brace approximately halfway between the seat and the front fork assembly. These three structural frame members are again brought out to a point on either side of the front of the bicycle that is approximately 8" to 18" off the ground and 8" to 18" away from the center line or frame of the bicycle. At this point 4 rigid attachment points have been created that are out of the way of the rider both in the riding position and in the walking position.

d) the pontoons themselves are of a high density-high compression styrofoam. Various thicknesses, widths, and lengths could be utilized for various size and weight capacities; however, the basic shape when folded down for the water should be flat, as is here described:

For a particular adult bicycle with a total weight capacity of 300 lbs: Using 2' wide×8' long×3" thick high density styrofoam blocks or sheets, we sandwich them lengthwise with 4 structural members similar to that used in the frame, 2 on top and 2 on bottom with long bolts through the whole assembly approximately every 12 inches. This adds both structural strength to the styrofoam as well as protection from skidding when in the down or flat position.

e) Triangulation is again used to obtain rigid strength at the four attachment points. Utilizing the top lengthwise structural members on the styrofoam, we bring up two short pieces of the same or similar material as is used for the bicycle frame attachment on each pontoon, and attach to the 4 bicycle attachment points. Rigidity is then accomplished by bracing of these 4 attachment rods across to the outer side top structural member sandwiching the styrofoam and another angled toward either the front or back from each of the 4 attachment points to the inner styrofoam structural member sandwiching the styrofoam.

f) the final braces are accomplished by an underneath brace that swings around behind both the front and back tires to correct the two pontoons and create added strength. Two more braces on each pontoon hold the pontoons in the down position. The back two are attached to the outer side top structural member sandwiching the styrofoam and the seat support post. The front bars criss-cross in front of the fork to support the pontoons in the up position and are detached and run to their full length to hold the pontoons in their down position. Small paddles of either metal or plastic are fastened to the rear wheel so as not to interfere with the hand brake for propulsion.

In the prototypes of the invention it was found that any one of the braces on either side could be taken loose without collapse of the frame; a redundancy creating an extra margin of safety along with the unsinkable high density styrofoam floats. It has also been experienced that with little skill maneuvering on both land and water can be accomplished and transformation from land to water and back again is accomplished in less than five minutes with the total of 6 movable braces.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing:

FIG. I is a front perspective view of this invention with the pontoons in the up or "land" position.

FIG. II is a rear perspective view of this invention with the pontoons in the down or "water" position.

FIG. III is a side perspective view of this invention's bicycle frame additions only.

FIG. IV is a side perspective view of this invention's pontoons in the down or "water" position and detached from the bicycle.

DESCRIPTION OF THE PROTOTYPE

Referring to FIGS. I, II, III, and IV of the present invention structural members (1) sandwich the high density styrofoam with 5 thin bolts, (2) three structural supports (3) come together at the front inside and back inside middle of each pontoon assembly at a bicycle frame attachment point (4) three structural supports (5) create the front attachment tripod to the front and three structural supports (6) create the back attachment tripod to the rear. It is at attachment point (4) that the pontoons pivot down for water or up for land travel. Cross braces (8) swing under the middle of the bicycle to brace between pontoons at the front and around the rear of the bicycle for the back pontoon to pontoon brace. Main brace (9) repositions from middle attachment in the "up" position to full length attachment in the "down" position while rear braces (10) are unclipped and swung into place at the back of the seat support where bolts and wing nuts are provided. Prototype uses 12 paddles (11) of either plastic or metal for propulsion, attached to spokes.

Prototypes built along these parameters have proven durable on land, with the frame and pontoons holding up well even over rough terrain, with excellent maneuverability and requiring little excess effort from human power. While waterborne, the frames and pontoons have proven very durable and stable tested in wind and waves to 2' and weights to 315 lbs. Maneuverability on water is simply achieved by turning the handlebars and leaning in the direction of the desired turn. Although the present invention can be turned over with effort by people over 150 lbs., it has also been found that stability is so good a 200 lb. person can walk completely around the prototype by keeping weight centered as much as possible. Redundancy of frame load and unsinkable styrofoam floats make this a very safe form of water transportation; not intended for high wind and waves.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

I claim:

1. An amphibious bicycle comprising:

a double-triangle bicycle frame provided with four attachment points, each said attachment point being formed at the outer end of a respective brace, each said brace formed as a tripod, including three legs extending from said attachment point to spaced apart locations on said frame, each said bicycle attachment point formed as a horizontal pivot point, each brace being affixed to the bicycle frame so as to not encumber either the pedaling or walking of the amphibious bicycle, a pair of buoyant pontoons, each provided with a pair of attachment points, each of said pontoon attachment points registering with one of said bicycle attachment points such that said pontoons can pivot between a lower water travel position and an upper land travel position, a plurality of paddles affixed to spokes of a rear wheel of said bicycle so as to provide propulsion in water and yet not inhibit operation of said wheel on land, said bicycle including a plurality of braces extending between said pontoons and said frame to secure said pontoons in each of said positions.

* * * * *